March 7, 1967 L. WICHMANN 3,308,309
CIRCUIT ARRANGEMENT FOR SUPPRESSING SPURIOUS SIGNALS
Filed March 10, 1964
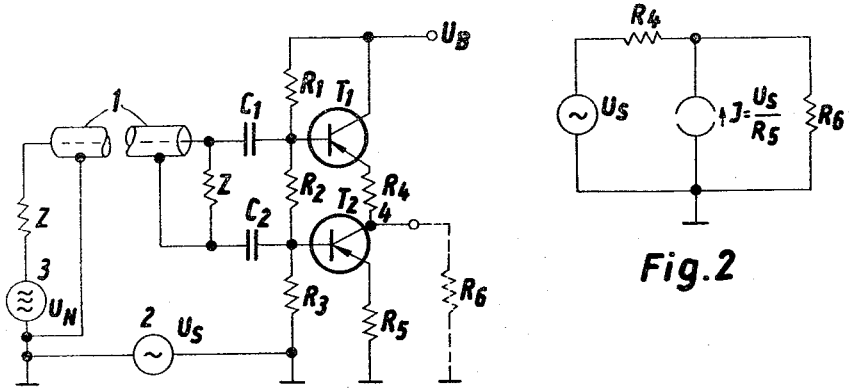
Fig.1
Fig.2
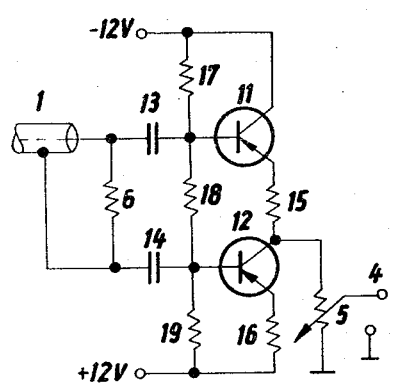
Fig.3
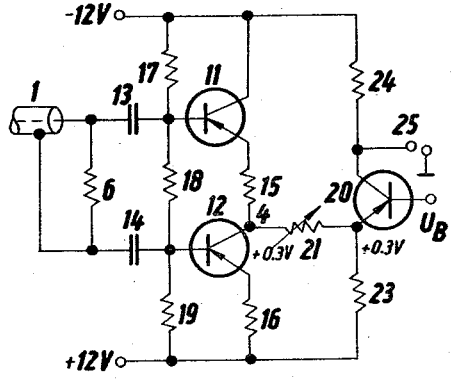
Fig.4
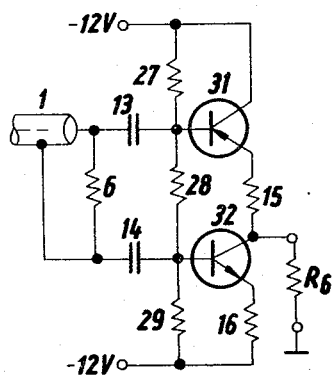
Fig.5
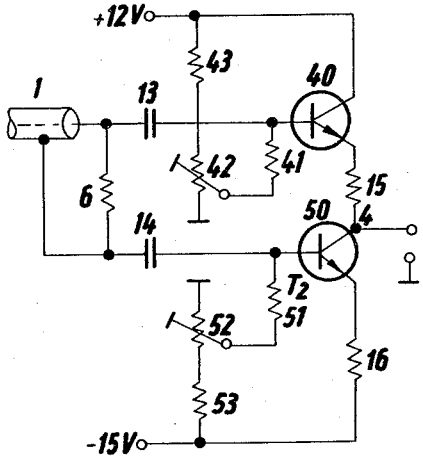
Fig.6
Inventor:
Lothar Wichmann
by
Michael J. Striker
Attorney United States Patent Office 3,308,309
Patented Mar. 7, 1967

3,308,309
CIRCUIT ARRANGEMENT FOR SUPPRESSING SPURIOUS SIGNALS
Lothar Wichmann, Mannheim, Germany, assignor to Fernseh G.m.b.H., Darmstadt, Germany
Filed Mar. 10, 1964, Ser. No. 350,800
Claims priority, application Germany, Mar. 15, 1963, F 39,249
6 Claims. (Cl. 307—88.5)

This invention relates to a circuit arrangement for suppressing spurious signals introduced into a transmission line as a result of differeing earth potentials at the ends of the line.

When unbalanced transmission lines are used to transmit signals from one place to another, the difficulty arises that the nominally equal potentials to which the earth conductor of the line is connected at its two ends may in practice be different, so that there flows through the earth conductor a current of which the magnitude depends upon the resistance of the conductor and the magnitude of the potential difference. The difference in earth potential is as a rule produced by alternating current of mains frequency and the current flowing in the earth conductor of the transmission line is therefore a 50 or 60 c./s. current. If the transmission line is used for transmitting signals covering a wide frequency range, such as television video signals, then the voltage drop occurring in the earth conductor of the transmission line becomes superimposed upon the wanted signal in the circuits associated with the transmission line.

A reduction of the current which can flow in the earth conductor of the transmission line as a result of a given potential difference between the earth connections at its two ends can be achieved by connecting the conductor to the earth connection at one end of the cable by way of a resistor having a resistance which is high compared with that of the earth conductor, which may for example be the outer conductor of a coaxial cable. When this is done the spurious voltage resulting from the difference in earth potentials appears on both conductors of the transmission line in the same phase compared to the potential of the local earth.

In order to separate the spurious voltage from the desired signal, therefore, the problem to be solved is to form the difference between the voltage appearing on the two conductors of the connecting lead. It is desirable that one of the two terminals between which the difference voltage appears shall be at the local earth potential for signal voltages. It is in addition often required that the output lead carrying no signal potential shall also be at the same direct potential as the local earth.

In general it is an object of the invention to provide a circuit arrangement for suppressing spurious signals introduced into a transmission line as a result of differing earth potentials at the ends of the line.

Another object of the invention is to provide an improved circuit arrangement as above described, which can be used for the transmission of television signals including NTSC color television signals.

These and other objects of the present invention may be achieved in an effective and simple manner by a circuit arrangement with a first and a second transistor, the emitter of said first transistor being connected to the collector of said second transistor by way of a resistor, the emitter of said second transistor being connected to one terminal of the direct current supply by way of a negative feed-back resistor, both resistors having the same value, the collector of said first transistor being connected to the other terminal of said direct current supply, the base of said second transistor being connected by way of a condenser to one conductor of said transmission line being nominally at earth potential as regards signal potentials, the base of said first transistor being connected by way of a condenser to the other conductor of said transmission line, the collector of said second transistor being connected to an ouput terminal of the circuit arrangement.

The circuit arrangement according to the present invention possesses the advantages of great simplicity, since two transistor-amplifiers only are needed. A further advantage which is of especial importance in the transmission of color television signals by the NTSC method, is that the differential phase error remains very small, since the collector of the first transistor carrying the signal voltage is earthed as regards signal potentials. As is known, in the NTSC method of color television signal transmission there is superimposed upon the video signal a color sub-carrier which is modulated in amplitude and in phase with the chrominance information. Any alteration in the phase of this sub-carrier in accordance with the modulation (differential phase distortion) would result in a falsification of the chrominance information and must therefore be kept to a minimum. If the television signal has been taken from the output electrode of an amplifier, specifically from the collector in the case of a transistor-amplifier, it is characteristic of a transistor-amplifier that the output signal taken from the collector, may be modulated by a spurious voltage appearing at the emitter, for the resultant change in collector-emitter voltage alters the transistor characteristics, thus resulting in differential phase distortion which may well exceed the permissible amount.

These and other features of the invention may be more clearly understood from the following detailed description and by the drawing, in which:

FIG. 1 shows the basic circuit diagram of a circuit arrangement according to the present invention;

FIG. 2 shows a circuit equivalent to that shown in FIG. 1;

FIG. 3 shows an embodiment of the invention providing facilities for gain control which does not affect the direct voltage component of the output signal;

FIG. 4 shows an alternative embodiment of the invention which also provides gain control which does not affect the output direct voltage level;

FIG. 5 shows an embodiment of the present invention using amplifiers with transistors of the complementary conductivity types; and FIG. 6 shows a further embodiment of the invention in which provision is made for adjusting the working points of the two transistors operating as amplifiers.

In FIG. 1 a coaxial cable 1 is connected between a signal source, represented by generator 3 developing a signal voltage $U_N$, and apparatus to which the signal generated by 3 is to be applied. This apparatus is assumed to have a local earth potential differing from that at the position of the generator 3, as is indicated by spurious signal generator 2. This generator is presumed to develop a spurious voltage $U_S$ at mains frequency. At the input of the cable the connecting line is terminated by its own characteristic impedance, represented by resistor Z. The signal fed into cable 1 from generator 3 may be a color television signal. At the receiving end of the cable it is again terminated by a resistor Z having a value equal to its characteristic impedance of e.g. 75Ω, so that the cable is matched at each end and any signal reflection will be very small.

The inner conductor of cable 1 is connected by way of an isolating capacitor $C_1$ with the base of a first transistor $T_1$, while the outer conductor is connected by way of an isolating capacitor $C_2$ with the base of a second transistor $T_2$. The bases of transistors $T_1$ and $T_2$ are appropriately biased by means of a potential divider consisting of resistors $R_1$, $R_2$ and $R_3$ connected in series across the direct current supply with a voltage $U_B$.

In accordance with the present invention the output terminal 4 is connected on the one hand directly to the collector of transistor $T_2$ and on the other hand by way of a resistor $R_4$ to the emitter of transistor $T_1$, which is connected to operate as an impedance-converter, its collector being returned directly to one pole of the direct current supply with the voltage $U_B$. In the emitter circuit of transistor $T_2$ is connected a further resistor $R_5$, the value of which is equal to that of $R_4$. Signals arising at output terminal 4 are applied to a load $R_6$ shown in broken line, because it does not form a necessary part of the circuit arrangement.

FIG. 2 shows a simplified equivalent circuit for the spurious-voltage compensating portions of this circuit arrangement. The component of the spurious voltage received at the base of transistor $T_1$ is shown as being fed by way of $R_4$ to the load $R_6$. At the same time there is fed into the load by way of transistor $T_2$ a current $I = U_s/R_5$. The components of spurious voltage applied to load $R_6$ are thus:

$$U_1 = U_s \frac{R_6}{R_4 + R_6}$$

from transistor $T_1$, and $$U_2 = -\frac{U_s}{R_5} \cdot \frac{R_4 \cdot R_6}{R_4 + R_6}$$

from transistor $T_2$.

In order that no spurious voltage $U_s$ shall appear in the output the condition which must be fulfilled is:

$$U_s \frac{R_6}{R_4 + R_6} = \frac{U_s}{R_5} \cdot \frac{R_4 \cdot R_6}{R_4 + R_6}$$

from which is follows that $R_4 = R_5$.

A further advantage of the circuit arrangement according to the invention will be seen in that the mode of operation is independent of the value of the load impedance $R_6$, for this value is eliminated from the condition for correct operation with the output free from spurious voltage components.

In the circuit arrangement according to the invention only the transistor $T_1$ operating as an emitter-follower stage into the load impedance represented by the combination of $R_4$ and $R_6$ is effective as regards the wanted signal. Any alteration of the collector-emitter voltage applied to this transistor which may result from the unwanted spurious signal will have substantially no effect upon the differential phase distortion.

In many applications it is desirable that the output voltage from a circuit arrangement according to the invention shall be adjustable, in order for example to be able to ensure a standard output level for different values of input signal voltage. FIG. 3 illustrates an embodiment of the invention which permits such an adjustment. Here the inner conductor of a coaxial cable 1 which is terminated by a matching resistor 6 is connected by way of an isolating capacitor 13 to the base of a first transistor 11, the collector of which is returned directly to a direct current supply having a potential of $-12$ v. with respect to earth. The outer conductor of cable 1 is similarly connected by way of an isolating capacitor 14 to the base of a second transistor 12, of which the emitter is returned by way of a resistor 16 to a direct current supply having a potential of $+12$ v. with respect to earth, while the collector is taken directly to an output terminal, which is also connected by way of a resistor 15 to the emitter of the first transistor 11. The bases of transistors 11 and 12 are connected to the junctions of a potential divider formed by resistors 17, 18, 19 which are connected in series across the direct current supply. Since in accordance with the invention resistors 15 and 16 have equal values, the direct potential of the output terminal will be midway between the potentials of the voltage sources to which the collector of transistor 11 and the emitter of transistor 12 are respectively returned. The output terminal will therefore be at zero direct potential with respect to earth. The magnitude of the output signal voltage may therefore be varied without altering the direct potential of the output lead by connecting a potentiometer 5 between the output terminal and earth and taking the output signal from the slider of potentiometer 5 by way of a terminal 4.

FIG. 4 shows an alternative embodiment of circuit arrangement according to the invention in which the collector of transistor 12 in a circuit arrangement similar to that described in relation to FIG. 3 is connected by way of a variable resistor 21 to the emitter of a third transistor 20, of which the base is returned to an appropriate bias source, represented by terminal $U_B$. The emitter of transistor 20 is connected by way of a resistor 23 to the $+12$ v. source, while the collector is returned by way of a load resistor 24 to the $-12$ v. Signals arising across load resistor 24 are fed out for use by way of terminals 25 returned to earth. Since in accordance with the invention resistors 15 and 16 are of equal value, variation of resistor 21 alters the magnitude of the alternating voltage applied to the emitter of transistor 20 without substantially altering the direct potential. The signal amplitude appearing at terminals 25 may thus be altered without changing the direct voltage.

In the embodiment of the invention shown in FIG. 5 complementary transistors 31, 32 are employed, so that both the transistors may be fed with the same direct voltage of $-12$ v. The circuit arrangement and mode of operation are otherwise as described in relation to FIG. 1.

The circuit arrangement shown in FIG. 6 permits the working points of the two transistors to be independently adjusted. In this case both transistors are of the n-p-n type. The base potential of transistor 40, to the base of which the inner conductor of coaxial line 1 is connected by way of coupling capacitor 13, is made adjustable by returning the base of the transistor by way of a resistor 41 to the slider of a potentiometer 42 which is connected in series with a resistor 43 across the $+12$ v. supply. Similarly the base of transistor 50 is returned by way of a resistor 51 to the slider of a potentiometer 52, which is connected in series with a resistor 53 across the $-15$ v. supply.

What is claimed as new and desired to be secured by Letters Patent is:

1. A circuit arrangement for suppressing spurious signals caused by differing earth potentials at the ends of an unbalanced transmission line, comprising a first and a second transistor, the emitter of said first transistor being connected to the collector of said second transistor by way of a resistor, the emitter of said second transistor being connected to one terminal of the direct current supply by way of a negative feed-back resistor, both resistors having the same value, the collector of said first transistor being connected to the other terminal of said direct current supply, the base of said second transistor being connected by way of a condenser to one conductor of said transmission line being nominally at earth potential as regards signal potentials, the base of said first transistor being connected by way of a condenser to the other conductor of said transmission line, the collector of said second transistor being connected to an output terminal of the circuit arrangement.

2. A circuit arrangement for suppressing spurious signals caused by differing earth potentials at the ends of an unbalanced transmission line, comprising a first and a second transistor of the same conductivity type, the emitter of said first transistor being connected to the collector of said second transistor by way of a resistor, the emitter of said second transistor being connected to one terminal of the direct current supply by way of a negative feed-back resistor, both resistors having the same value, the collector of said first transistor being connected to the other terminal of said direct current supply, having approximately the same voltage in opposite sense as said one terminal as regards earth potential, the base of said second transistor being connected by way of a condenser to one conductor of said transmission line being nominally at earth potential as regards signal potentials, the base of said first transistor being connected by way of a condenser to the other conductor of said transmission line, the collector of said second transistor being connected to an output terminal of the circuit arrangement.

3. A circuit arrangement for suppressing spurious signals caused by differing earth potentials at the ends of an unbalanced transmission line, comprising a first and a second transistor of the same conductivity type, the emitter of said first transistor being connected to the collector of said second transistor by way of a resistor, the emitter of said second transistor being connected to one terminal of the direct current supply by way of a negative feedback resistor, both resistors having the same value, the collector of said first transistor being connected to the other terminal of said direct current supply having approximately the same voltage in opposite sense as said one terminal as regards the earth potential, the base of said second transistor being connected by way of a condenser to one conductor of said transmission line being nominally at earth potential as regards signal potentials, the base of said first transistor being connected by way of a condenser to the other conductor of said transmission line, the collector of said second transistor being connected to a potentiometer, the slider of which being connected to an output terminal of the circuit arrangement.

4. A circuit arrangement for suppressing spurious signals caused by differing earth potentials at the ends of an unbalanced transmission line, comprising a first and a second transistor of the same conductivity type, the emitter of said first transistor being connected to the collector of said second transistor by way of a resistor, the emitter of said second transistor being connected to one terminal of the direct current supply by way of a negative feedback resistor, both resistors having the same value, the collector of said first transistor being connected to the other terminal of said direct current supply having approximately the same voltage in opposite sense as said one terminal as regards the earth potential, the base of said second transistor being connected by way of a condenser to one conductor of said transmission line being nominally at earth potential as regards signal potentials, the base of said first transistor being connected by way of a condenser to the other conductor of said transmission line, the collector of said second transistor being connected to the emitter of a third transistor by way of a variable resistor, the collector of said third transistor being connected to an output terminal of the circuit arrangement.

5. A circuit arrangement for suppressing spurious signals caused by differing earth potentials at the ends of an unbalanced transmission line, comprising a first and a second transistor of complementary conductivity, the emitter of said first transistor being connected to the collector of said second transistor by way of a resistor, the emitter of said second transistor being connected to one terminal of the direct current supply by way of a negative feedback resistor, both resistors having the same value, the collector of said first transistor being connected to the other terminal of said direct current supply having approximately the same voltage with the same polarity as regards the earth potential, the base of said second transistor being connected by way of a condenser to one conductor of said transmission line being nominally at earth potential as regards signal potentials, the base of said first transistor being connected by way of a condenser to the other conductor of said transmission line, the collector of said second transistor being connected to an output terminal of the circuit arrangement.

6. A circuit arrangement for suppressing spurious signals caused by differing earth potentials at the ends of an unbalanced transmission line for television signals including color television signals, comprising a first and a second transistor, the emitter of said first transistor being connected to the collector of said second transistor by way of a resistor, the emitter of said second transistor being connected to one terminal of the direct current supply by way of a negative feed-back resistor, both resistors having the same value, the collector of said first transistor being connected to the other terminal of said direct current supply, the base of said second transistor being connected by way of a condenser to one conductor of said transmission line being nominally at earth potential as regards signal potentials, the base of said first transistor being connected by way of a condenser to the other conductor of said transmission line, the collector of said second transistor being connected to an output terminal of the circuit arrangement.

No references cited.

ARTHUR GAUSS, *Primary Examiner.*

J. ZAZWORSKY, *Assistant Examiner.*